April 18, 1933.    M. ZAIGER ET AL    1,904,343
SPLASH FLAP FOR AUTOMOBILES
Filed June 15, 1932
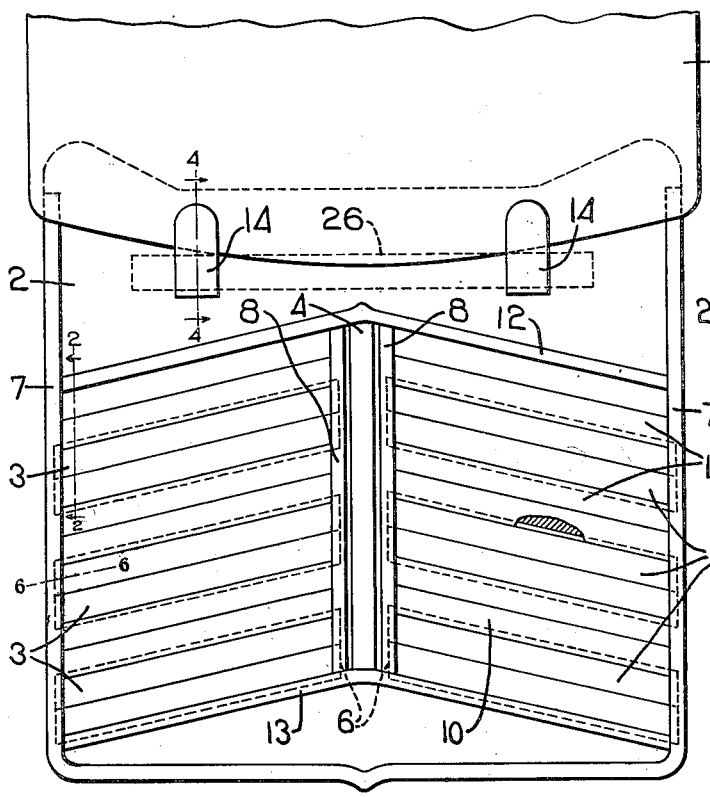
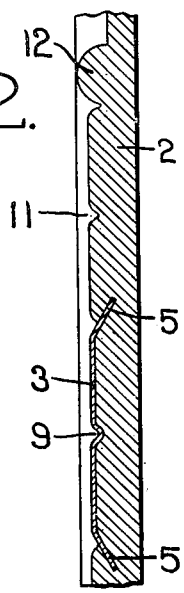
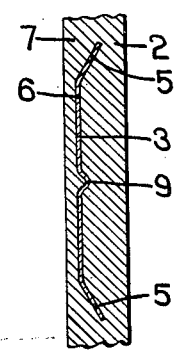
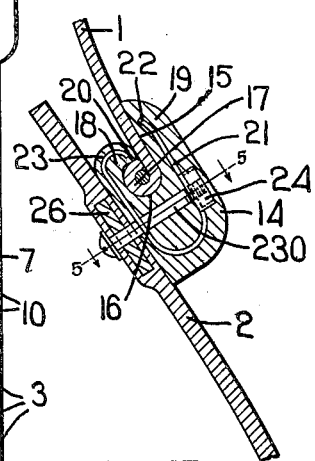
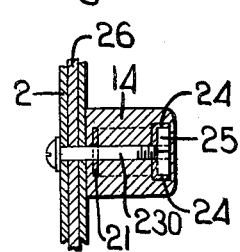
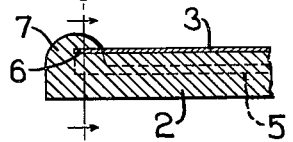
Inventors.
Max Zaiger
Louis Zaiger
by Heard Smith & Tennant.
Attys Patented Apr. 18, 1933

1,904,343

UNITED STATES PATENT OFFICE

MAX ZAIGER, OF SWAMPSCOTT, AND LOUIS ZAIGER, OF LYNN, MASSACHUSETTS

SPLASH FLAP FOR AUTOMOBILES

Application filed June 15, 1932. Serial No. 617,358.

This invention relates to splash flaps for automobiles and particularly to a splash flap of the type which is molded from rubber or similar moldable material and which has strips of metal exposed on its rear face.

One of the objects of the invention is to provide a splash flap of this type in which the metal is molded into the rubber splash flap and is thus permanently connected thereto in such a way that said strips will not become loosened from the flap under ordinary conditions of use.

Another object of the invention is to provide a splash flap of this type which is capable of flexing in a transverse direction.

An advantage of this construction is that either side edge of the flap can yield or give somewhat in case the flap strikes an obstruction thus preventing injury to the flap.

Another object of the invention is to provide an improved clip device or attaching device for attaching the flap to the fender.

In order to give an understanding of the invention we have illustrated in the drawing a selected embodiment thereof which will now be described after which the novel features will be pointed out in the appended claims.

Fig. 1 is a view of a portion of an automobile fender with our improved flap applied thereto;

Fig. 2 is an enlarged section on the line 2—2, Fig. 1;

Fig. 3 is a section on the line 3—3, Fig. 6;

Fig. 4 is an enlarged section on the line 4—4, Fig. 1;

Fig. 5 is a section on the line 5—5, Fig. 4;

Fig. 6 is a section on the line 6—6, Fig. 1.

In the drawing 1 indicates the end of an automobile fender and 2 indicates generally the splash flap embodying our invention and which is attached thereto. This splash flap is molded from rubber or some other suitable moldable material.

The splash flap has exposed on its rear face a plurality of strips 3 of metal, said strips extending transversely of the flap and being spaced from each other so that bands of rubber are exposed between the metal strips. These metal strips may be of any desired metal but will preferably be some metal which can be readily polished or will retain a polish such as chromium-plated metal.

One feature of the invention relates to a flap which has these metal strips exposed on its rear face and which is capable of flexing in a transverse direction. This is accomplished by employing metal strips which extend only part way across the width of the flap so that the central line of the flap is free from such transversely-extending metal strips. In the construction shown the metal strips are arranged in two vertical rows, one on each side thereby leaving a central space 4 which is free from these strips. The metal strips, of course, stiffen the portion of the flap to which they are applied and hence in our invention each side edge of the flap will be non-flexible in a transverse direction but the entire flap may be bent centrally along the central portion 4. This is of considerable advantage because if while the flaps are in use the edge of the flap engages any object which tends to crowd the flaps edgewise the side of the flap with which said object engages can give or yield thus avoiding possible tearing of the flap.

In order to provide a construction in which the metal strips shall be permanently and firmly secured to the flap body we propose to mold said strips to the flap body. This is done by placing the metal strips 3 in proper position in the mold in which the flap is molded and then pouring the rubber into the mold and performing the molding operation. The molding is so done that the edges of each strip become embedded in the rubber and thus each strip is firmly and permanently secured to the rubber.

As shown herein each metal strip 3 has its longitudinal edges bent backwardly slightly as indicated at 5 and in the molding operation the rubber flows over and encloses these longitudinal edges 5 so that in the completed article said edges are embedded in the rubber. The same is true of the end edges 6 of the strips 3. The flap is made with the edge bead 7 running along each edge and with the two central beads or ribs 8 at either side of the central space 4. The end edges 6 of each metal strip 3 are embedded in these ribs or beads. The outer end edge of each metal strip is embedded in one of the edge beads 7 and the inner edge 6 is embedded in the center bead 8 as shown in dotted lines in Fig. 1. Thus all the edges of each metal strip 3 are embedded in the rubber of the flap, such embedding of the edges being secured by the molding operation during which the rubber of which the flap is made flows around the edges as the molding operation is performed.

Each metal strip 3 is shown as being deformed along a central longitudinal line to form a longitudinal depression 9 therein, this being for ornamental purposes.

As stated above the metal strips 3 are spaced from each other so that the material of which the flap is made will be exposed in the bands or zones between the strips which are indicated at 10. These bands or zones will preferably be formed with a depression 11 extending from the outer rib 7 to the central rib 8 so that the alternate metal-faced zones and rubber zones will each have a depression or groove extending from the outer rib 7 to the inner rib 8. The flap is also shown as having a transverse rib 12 formed on its face above the metal strips and another transverse rib 13 formed on said face below the metal strips, said ribs 12 and 13 having a slightly V shape.

Any suitable way of attaching the flap to the fender 1 may be employed. We have herein shown a so-called "slip-on" fastening device which is made separate from the flap and which is constructed so that the fastening device can be readily applied to the beaded edge of the fender by slipping it thereover.

The fastening devices are indicated generally at 14 and each is in the form of a rubber member having at its upper end a groove 15 to receive the fender, which groove terminates at its lower end in an enlarged portion 16 adapted to receive the bead 17 at the edge of the fender. The two portions 18 and 19 of each fastening device on either side of the groove form two attaching jaws between which the bead of the fender may be crowded when the device is applied to the fender.

In attaching the fastening device to the fender the jaws 17 and 18 become separated from each other as the bead is crowded between them and then they close together again after the bead has been seated in the enlarged opening 16.

The jaw 18 provides a shoulder 20 which snaps over the bead 17 thereby to lock the attaching device to the fender.

In order to reinforce the jaws we propose to employ a U-shaped spring member 21 which is embedded in the rubber attaching device and one end 22 of which is located within the jaw 19 and the other end 23 of which is located within the jaw 18. This end 23 is curved back on itself somewhat so that the terminal edge thereof reinforces the shoulder 20. This attaching member is secured to the flap 2 through the medium of a clamping bolt 230, which bolt extends through the flap and through the arms forming the two sides of the U-shaped reinforcing member 21.

One arm of this U-shaped reinforcing member is formed with flanges 24 which are embedded in the rubber of the attaching member 14 and between which is received a nut 25 that is also embedded in the rubber of the attaching member. The clamping bolt 230 extends through the flap 2 at its upper edge into the attaching member 14 and screws into the nut 25.

For attaching the device to the fender the clamping screw will be loosened so as to provide for spreading of the jaws 18, 19 sufficiently to allow the attaching device to be slipped onto the edge of the fender. When the attaching device is in place on the fender then the clamping bolt 230 is tightened, the tightening of which serves to close the jaws firmly together against the edge of the fender 1 and also to firmly attach the upper edge of the flap to the jaws.

The body of the flap is shown as having a metal strip 26 embedded therein and the clamping bolts 230 extend through apertures in this strip. This metal strip is resilient and it not only reinforces the upper edge of the flap but also serves to hold the flap in flexed conformity to the under side of the fender 1.

While we have shown the invention as applied to splash flaps yet in its broader aspect it has to do with molding metal strips or plates into a body of moldable material so that the strips or plates are exposed on the surface of the body member but have their edges embedded in the body member. Therefore, while we have shown this idea as embodied in a splash flap yet we do not wish to be limited to its use in splash flaps but intend the claims, except for those which are specifically directed to a splash flap, to cover other articles of moldable material which have the plate or strip or its equivalent molded into the material in such a way that a portion of the strip or plate is exposed on the material for ornamental purposes.

We claim.

1. A splash flap for automobiles made of moldable material and having metal strips molded into it, a portion of each strip being exposed on the rear face of the flap, and some of the edges of each strip being embedded and entirely enclosed in the moldable material of the flap.

2. A splash flap for automobiles made of moldable material, said flap having metal strips exposed on its rear face, all the edges of each strip being embedded in the material from which the flap is made.

3. A splash flap for automobiles comprising a body portion of moldable material and metal strips attached to the rear face of the flap and having their longitudinal edges bent inwardly and embedded in the material of the flap.

4. A splash flap for automobiles comprising a body portion of moldable material and metal strips attached to the rear face of the flap and having their longitudinal edges bent inwardly and embedded in the material of the flap, and also having their end edges embedded in said material.

5. A splash flap for automobiles comprising a body portion of moldable material and having exposed on its rear face a plurality of metal strips extending from each outside edge nearly to the center, all the edges of each strip being embedded in the material.

6. A splash flap for automobiles comprising a body portion of moldable material and having exposed on its rear face a plurality of metal strips extending from each outside edge nearly to the center, the central portion of the body being free from strips whereby said body can be flexed transversely.

7. A splash flap for automobiles comprising a body portion of moldable material having two series of metal strips exposed on its rear face, the strips of each series extending from an outside edge of the flap nearly to the center and being inclined with reference to said outside edge, the central portion of the body being free from strips, whereby said body can be flexed transversely.

In testimony whereof, we have signed our names to this specification.

MAX ZAIGER.
LOUIS ZAIGER.